Nov. 29, 1966  R. S. WEBB  3,289,029
SERVO FEED APPARATUS FOR ELECTRICAL DISCHARGE MACHINING
Filed Sept. 16, 1965  5 Sheets-Sheet 1
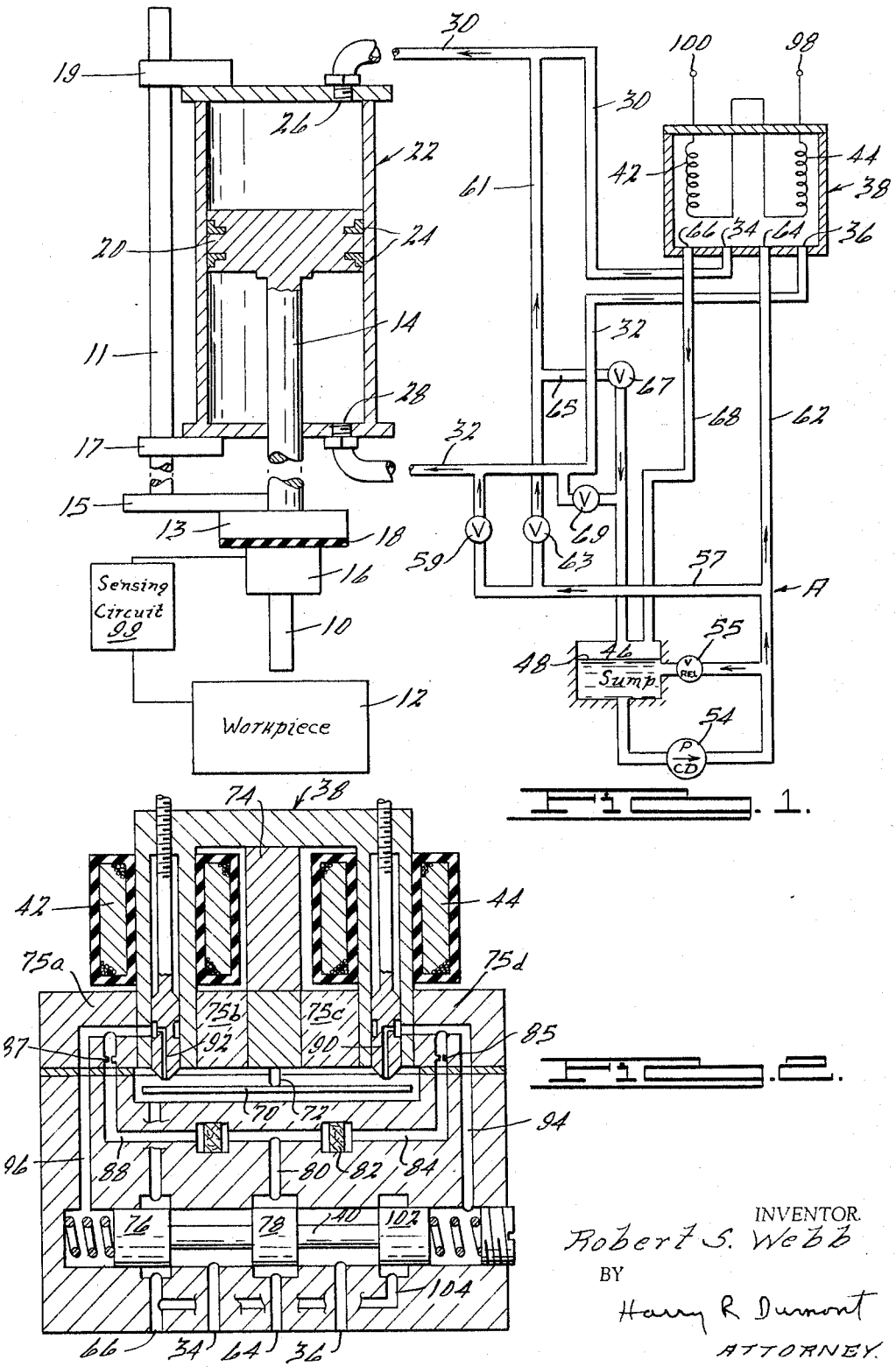
INVENTOR.
Robert S. Webb
BY
Harry R. Dumont
ATTORNEY.

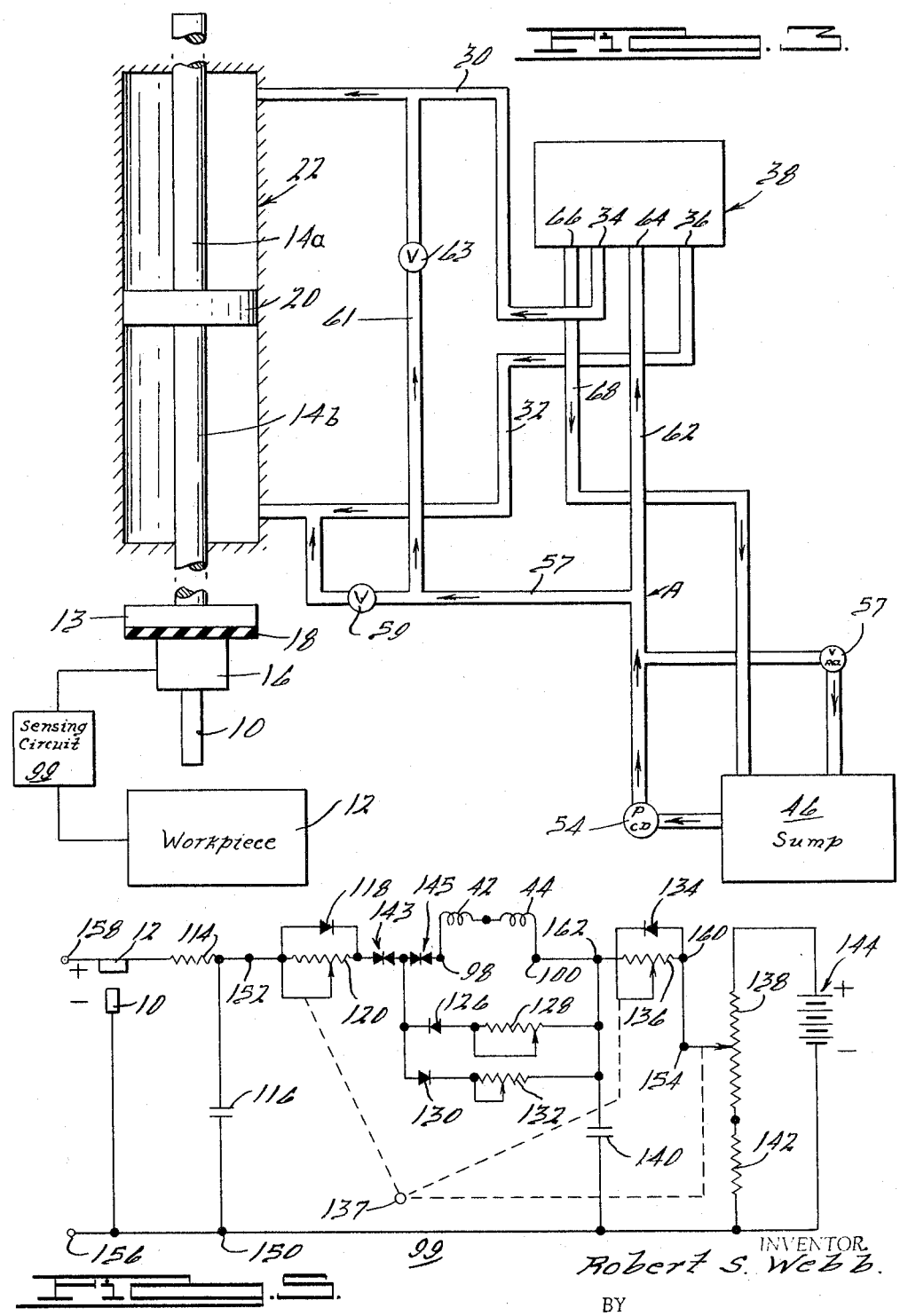

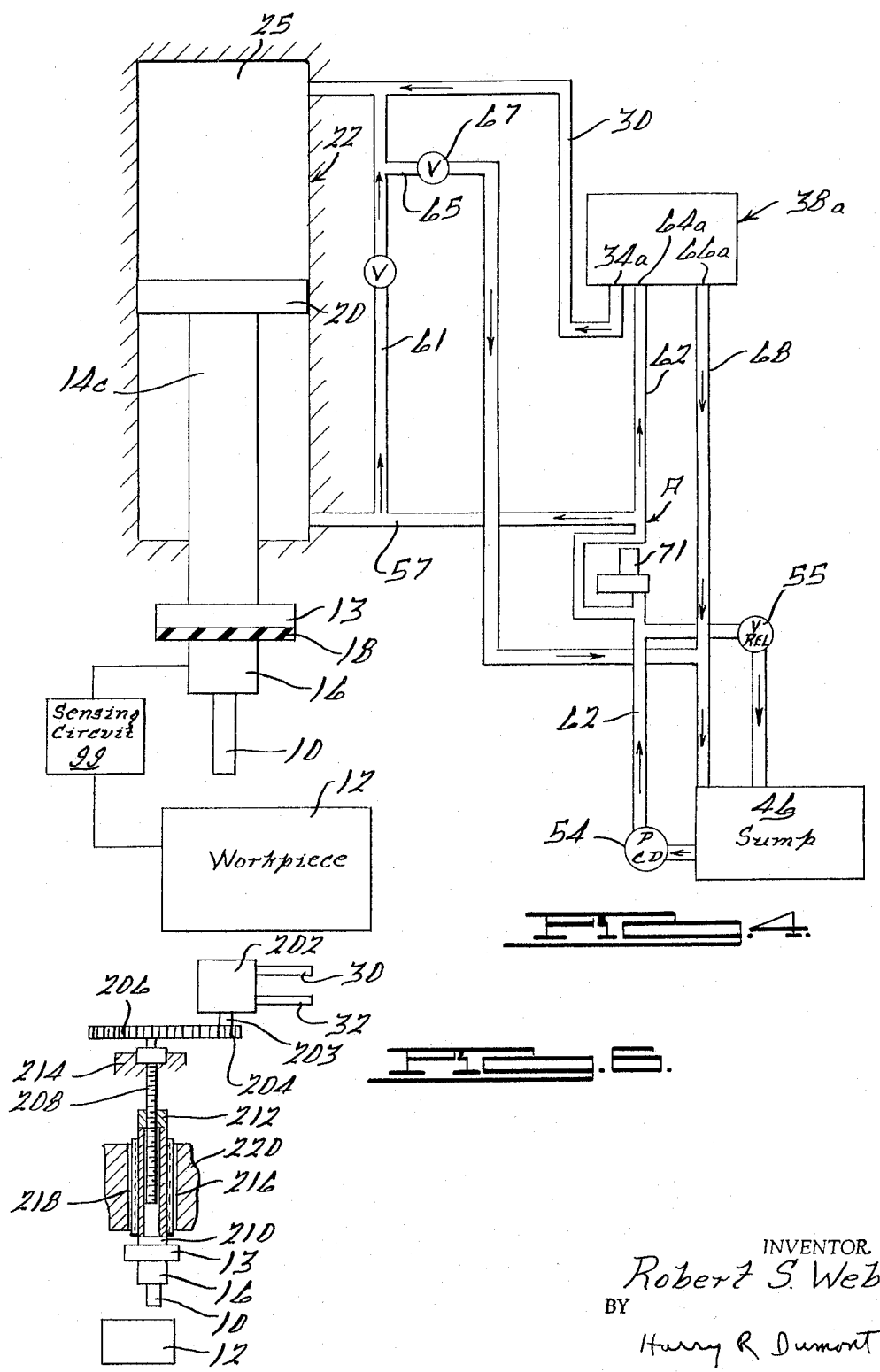

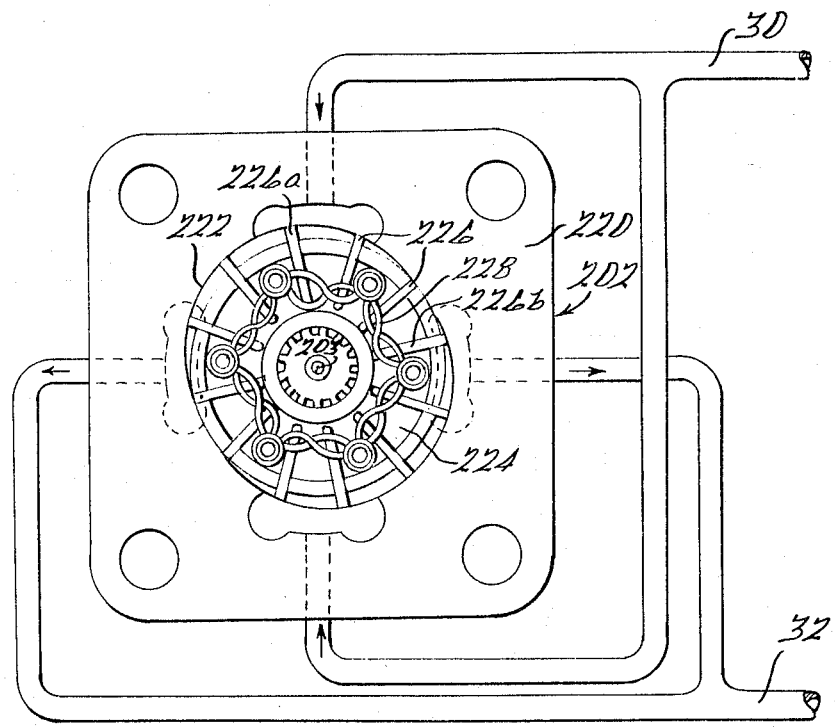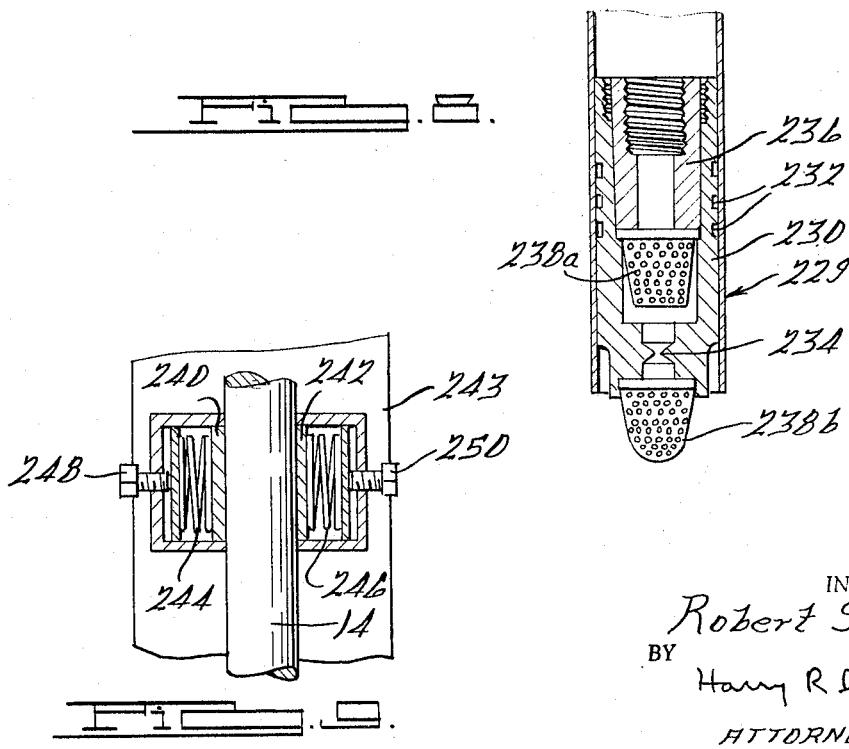

Nov. 29, 1966  R. S. WEBB  3,289,029
SERVO FEED APPARATUS FOR ELECTRICAL DISCHARGE MACHINING
Filed Sept. 16, 1965  5 Sheets-Sheet 5
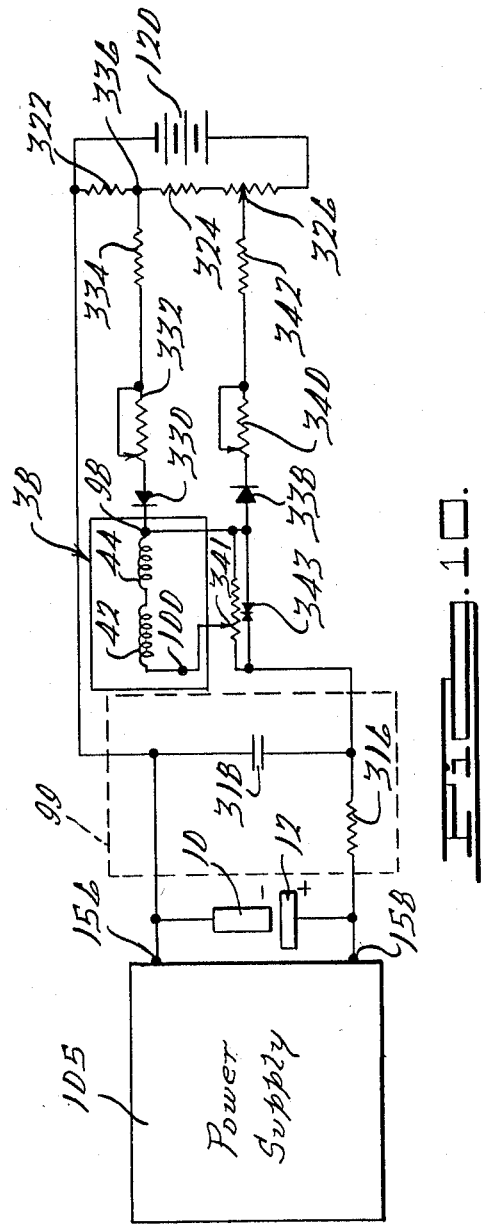
FIG. 10.
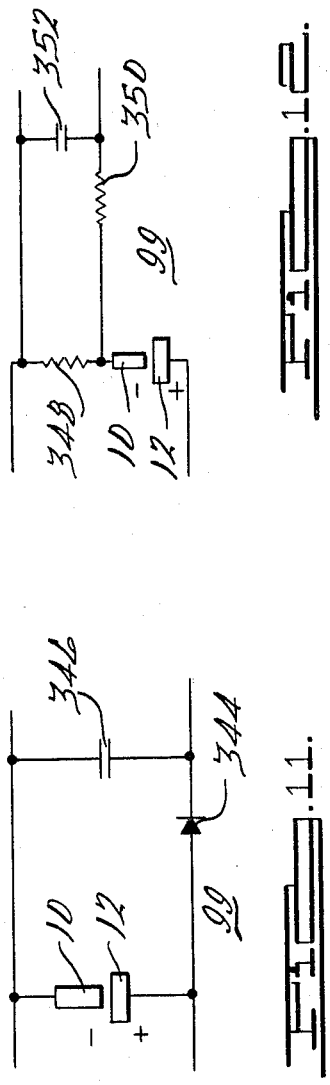
FIG. 12.
FIG. 11.
INVENTOR.
Robert S. Webb
BY
Harry R. Dumont
ATTORNEY.

United States Patent Office 3,289,029
Patented Nov. 29, 1966

3,289,029
SERVO FEED APPARATUS FOR ELECTRICAL
DISCHARGE MACHINING
Robert S. Webb, Bloomfield Hills, Mich., assignor to Elox
Corporation of Michigan, Troy, Mich., a corporation
of Michigan
Filed Sept. 16, 1965, Ser. No. 487,711
26 Claims. (Cl. 314—61)

This application is a continuation-in-part of my application No. 234,973; entitled "Dead Center Hydraulic System"; filed November 2, 1962, now Patent No. 3,230,412.

This invention relates generally to electrical discharge machining apparatus and, in particular, to an improved servo feed apparatus therefor.

Electrical discharge machining, variously referred to in the art as EDM, spark machining, or arc machining is carried on by passing a series of discrete, localized, extremely high current density discharges across a gap between a conductive tool electrode and a conductive workpiece at sonic or ultrasonic frequencies in the presence of a dielectric fluid for eroding the workpiece. In the hydraulic and mechanical servo feeds currently in use, a sensing and control circuit is used to monitor the position of the electrode with respect to the workpiece at all times, to sense electrical conditions in the gap which conditions in turn are representative of gap spacing, and to cause advance or retraction of the electrode as required.

Fluid actuated or hydraulic servo feed systems have certain basic advantages over servo feed systems of the mechanical or electro-mechanical type. Among these advantages are greater speed of response, much greater output forces, and lower control power requirements. The present invention is equally applicable to servo feed systems of the hydraulic and of the mechanical type.

One outstanding problem of any servo feed system is its instability at null or static conditions. During the servo feed operation, it is generally desirable to have three clear-cut conditions of motion; advance, null or stationary condition, and retraction. Instability about null makes it virtually impossible to set up a system for clear-cut operation in these three distinct movements. Factors contributing to unbalance at the null condition include temperature drift affecting both electrical and hydraulic components, changes in operating pressure, deadband or hysteresis within the servo valve, changing static friction characteristics of the system, different static loads for different size and weight of fixtures and tooling, and different dynamic loads resulting from tool force or from coolant force between the electrode and workpiece.

Another disadvantage inherent in the use of fluid actuated or hydraulic servo feed systems is their backlash characteristic. The presence of this backlash characteristic in electrical discharge machining, as in any precise machining operation, presents a particularly serious problem. For example, where the operation is of the finishing type, the approximate maximum feed rate of 30 inches per minute frequently is lowered to about .000001 inch per minute. When the electrode approaches the workpiece, the actual machining may begin in response to a sensing circuit at the optimum gap at about .003 inch. The servo system must establish a null condition and, thereafter, preferably feed at a very slow rate. It will be seen that, if there is appreciable backlash in the system, the electrode will overrun the optimum gap distance and backup will result. Upon backup, the backlash will cause overrun in the opposite direction and a continuous hunting action may be set up which is deleterious to the stable operation of the electrical discharge machining apparatus.

The prime object of my invention is to overcome operating deficiencies of the above-described types which may occur in any electrically controlled servo feed system and to improve their stability of operation.

It is an additional object of my invention to provide an improved servo feed system in which a predetermined threshold of operation of the motive means may be preset by the parameters of the electrical control circuit utilized.

It is a further object of my invention to provide an improved, hydraulically actuated, electrically controlled servo feed system in which the null position of the motive element of the hydraulically actuated system may be selectively varied by simple and readily adjustable fluid control means and in which the electrical control circuit is simultaneously operable to provide a predetermined electrical null range of operation.

It is a still further object of this invention to provide an improved electrically controlled closed loop servo system in which operating stability is provided for the electrically energized element by signal modifying means effective to provide a presettable "deadband" or null range of operation.

Other objects and advantages will become apparent from the following specification which, taken in conjunction with the accompanying drawings, discloses preferred and alternate forms of the invention.

In the drawings, in which reference characters have been used to designate like parts referred to herein:

FIGURE 1 is a schematic view of an electro-hydraulic servo feed system employing a cylinder shown in vertical section to disclose the detail of its construction;

FIGURE 2 is a detail, sectional view on an enlarged scale of the directional control valve utilized in the hydraulic servo feed system of FIGURE 1;

FIGURE 3 is an alternate embodiment of the system as shown in FIGURE 1;

FIGURE 4 is a further embodiment of the hydraulic system further distinguished by the incorporation of a directional control valve of the three-way or single control port operating type;

FIGURE 5 is a schematic diagram showing the electrical control circuit which, in response to an electrical characteristic of the gap, controls operation of the directional control valve;

FIGURE 6 is a diagrammatic view of an alternate system utilizing the present invention in connection with a hydraulic motor of the rotary type;

FIGURE 7 is an elevational view, with end plate removed, of the rotary type hydraulic motor of FIGURE 6;

FIGURE 8 is a cross-sectional view of fixed orifice, flow restrictive means which may be utilized in place of certain flow control valves in the apparatus of FIGURES 1, 3, and 4 to provide an alternate embodiment of the present invention;

FIGURE 9 is a sectional view of a means for applying a selectively controlled static friction which may be utilized in the systems of FIGURES 1, 3, 4, and 6;

FIGURE 10 is an alternate form of the electrical control circuit shown in FIGURE 5; and FIGURES 11 and 12 are alternate types of sensing circuits which may be incorporated in the circuits of FIGURES 5 and 10.

With reference to FIGURE 1, it will be seen that I have shown a fluid actuator system herein embodied as a power feed system for an electrode 10 which is intended to be fed toward a workpiece 12 for machining the same by intermittent electrical discharge. It will be understood that a dielectric fluid is usually maintained in the gap provided between electrode and workpiece in electrical discharge machining. It will further be apparent that, while the present invention is described as showing a hydraulic servo system for moving an electrode with reference to a stationary workpiece, it may as readily be applied to a hydraulic servo system in which the electrode is maintained stationary and the workpiece is moved toward and away from the electrode with a simple reversal of parts and motion. Electrode 10 is secured to a piston rod 14 by a suitable holder 16 which is electrically insulated from the rod by an insulating member 18. A guide bar 11 is secured to a platen 13 by support 15 and therefore is carried by the motion of rod 14. Guide blocks 17 and 19 are mounted at opposite ends of cylinder 22 to provide an external arrangement to prevent the rotation of rod 14. It is understood that this guide bar arrangement may be replaced by a ram and V-way construction well known in the machine tool field. The rod 14 is carried by a power feed piston 20 disposed and differentially positionable in a cylinder 22. Piston 20 is provided with peripheral seals 24 of a suitable resilient material. Fluid inlet-outlet ports 26, 28 are disposed in the respective cylinder heads, these ports being connected through conduits 30, 32 to a directional control valve 38 of the four-way type, that is, having four conduit connections; one from the pressure source, a second to the reservoir or sump, and the other two control lines connected, respectively, to each end of the work cylinder. Directional control valve 38 is controlled in its operation by a pair of electro-magnetic coils 42, 44 and has a mode of operation which will be described in detail with reference to FIGURE 2, hereinafter.

The fluid circuit comprises a reservoir or sump 46 which contains fluid 48. The fluid 48 is drawn from sump 46 by a constant pressure delivery pump 54. The pump, which may typically operate in a range of 500–3000 p.s.i. forces the fluid in flow paths indicated by arrows on the various figures of the drawings. It will be noted that, downstream of pump 54, is a relief valve 55 operable to assist in effectively maintaining a source of constant pressure fluid. Operating pressure from pump 54 is furnished through conduit 62 to input port 64 of valve 38. Suitable filter elements may be incorporated in the pressure system as required. The pressure system is completed from valve 38 through conduits 30 and 32 which are connected to the respective heads of cylinder 22. Exhaust flow from valve 38 is provided through valve port 66 into conduit 68 which returns the fluid to sump 46. As will be seen from FIGURES 1 and 2, the valve 38 is electrically controlled by the operation of a pair of selectively energized coils 42, 44. The control signals, which are of variable amplitude of signal and polarity at terminal points 98 and 100, originate from a sensing circuit 99 which is utilized to sense the position of the electrode 10 with respect to workpiece 12 as indicated by an electrical characteristic of the gap. The output of the sensing circuit provides a signal to the servo system when downfeed or backup is necessary to maintain optimum gap distance between electrode 10 and workpiece 12. Sensing circuit 99 will be shown and described in FIGURE 5, hereinafter.

FIGURE 1 further shows the means utilized in the present invention for applying the balancing pressure at null to maintain piston 20 stationary. Conduit 57 is connected between a point of predetermined fixed pressure at point A, in the present instance, a junction with conduit 62 downstream of relief valve 55, and inlet port 28 at the lower head of cylinder 22. Connected in conduit 57 is a flow control valve 59 for adjusting the flow of fluid to the lower face of piston 20. An additional conduit 61 is connected communicating between conduit 57 and inlet port 26 in the upper head portion of cylinder 22. Conduit 61 has connected therein a flow control valve 63 for presetting the flow of fluid to the upper face of piston 20. A third conduit 65 serves the purpose of an exhaust from conduit 61 and has connected therein a flow control valve 67 to control the fluid flow to sump 46. A fourth flow control valve 69 connects from conduit 32 to sump 46 and is required in certain instances as will be explained in the section "Description of operation" hereinafter. It wll be seen that the selectively preset flow through valves 59, 63, 67 and 69 in conjunction with static friction normally opposing movement of the piston 20 provides a force balanced system. This system will serve to maintain the piston 20 in its own fixed and stable null location both at and near the null condition of servo valve 38 as determined by the central and near central positioning of spool 40 therein.

FIGURE 2 shows the detail of the elements of directional control valve 38 including the pair of electrically energizable coils 42 and 44 which control the operation of valve 38 and the subsequent movement of piston 20 in response to the electrical output of sensing circuit 99 as received at terminals 98 and 100 of FIGURE 1. Coils 42, 44 may be connected in series, parallel, or in "push-pull" relationship, it being necessary only to correctly phase the coils so that the desired direction of operation of piston 20 carrying electrode 10 is obtained with a reversal of polarity across the coils. In the present instance, coils 42, 44 are connected in series. It will be seen that valve 38 incorporates a sensitive first stage and a second stage which is operable in response to operation of the quickly acting first stage. A hydraulic amplification is present in valve 38 which causes the relatively low differential pressure developed in its first stage to be amplified in the second stage in such a manner that relatively high pressures are available as required to operate the power feed piston 20.

The first, electrically operated stage of valve 38 is controlled by a flapper 70. Flapper 70 has a central pivotal mounting indicated at point 72 and its positioning is governed by permanent magnet 74 and by the action of coils 42, 44, which add or subtract flux in accordance with their selected energization. A body portion of non-magnetic material is indicated by the numerals 75, a, b, c, d, which is preferably constructed in one integral part. In the operation of valve 38 in a balanced or null condition, fluid flow is through inlet port 64, around land portion 78 of spool 40, through passage 80, filters 82, passages 84 and 88 to fixed restrictions 85 and 87, to nozzles 90 and 92 which are directed toward respective end portions of flapper 70. It will be seen that passages 94 and 96 are open to fluid flow but, in the balanced condition of the servo valve, no spool displacement or operating fluid output results.

Let us assume that the polarity of terminals 98–100 as shown in FIGURE 1 is such that downfeed of electrode 10 is called for. In such instance, coils 42, 44 are energized in such polarity that flapper 70 is attracted toward nozzle 92 and away from nozzle 90. As flapper 70 has a movement toward nozzle 92, increased pressure is developed in passage 96 through action of restriction 87 and decreased pressure results in passage 94 through action of restriction 85. The movement of spool 40 is then initiated in a rightward direction. This subjects port 34 to the full pressure of port 64 and port 36 is opened to exhaust port 66 by the movement of land 102 of spool 40 to uncover passage 104. Thus, pressure is substantially increased at port 34 and correspondingly decreased at port 36 resulting in a downward movement of piston 20. Upon the signalling of electrode retraction or backup from sensing circuit 99, coils 42, 44 are oppositely polarized to provide the opposite movement of flapper 70. In its left hand position, land 76 of spool 40 serves to open port 34 to exhaust while land 78 has opened port 36 to pressure. As a result of pressure on port 36 and exhaust on port 34, an upward movement of piston 20 is initiated.

The advantage of the use of a two-stage valve in operation of the instant power feed system is believed evident when it is considered that redistribution of fluid pressures from the first valve stage may result in only one or two pounds net differential force on spool 40. Cylinder 22 may be operated at 1000 p.s.i. or more and have a ram area of 10 square inches or more to generate up to 50,000 pounds of force. To operate spool 40 directly with sufficient sensitivity would be extremely difficult, while operation of flapper 70 with the relatively small electrical forces available is entirely practical.

FIGURE 3 shown an alternate embodiment of the invention as shown in FIGURE 1. The basic components of the hydraulic system including pump 54 and servo valve 38 remain the same. However, the design of the fluid motor portion of the hydraulic system has been altered to provide two rods 14a and 14b mounted on piston 20. Rods 14a and 14b are of substantially equal cross sectional area so that the upper and lower faces of piston 20 are equal. Flow restrictions to provide properly regulated balancing forces on the faces of piston 20 are incorporated in conduits 57 and 61, again are embodied as flow control valves 59 and 63, while exhaust conduits 65 and 67 have been eliminated. It should be noted that while conduits 57 and 61 are connected to a common source of constant pressure, namely pump 54, they may as effectively be connected to any source providing a fixed pressure point such as, for example, an external source of pressure or the sump, representing a point of zero pressure, itself.

FIGURE 4 shows a further embodiment of the present invention in which four-way valve 38 has been replaced by a three-way directional control valve 38a. Three-way directional control valves are well known in the hydraulic art and may be characterized as having three conduit connections; one from the pressure source, a second to the reservoir or sump, and a third providing a single variable output line to one end of the work cylinder. Valve 38a is also a two stage valve in which the first stage is electrically operable in response to control signals from sensing circuit 99 and is essentially similar to that shown in FIGURE 2 for valve 38. The second stage has incorporated in it a three-way spool valve of the type well known in the art in which differential positioning of its spool provides a variable control output from a single outlet port 34a which is directed through conduit 30, through the upper head 25 of cylinder 22, and against the upper face of piston 20. Also diagrammatically shown are the inlet port 64a receiving operating fluid from pump 54 and exhaust port 66a returning fluid to sump 46. Included in conduit 62 downstream of pump 54 is an arrangement of a gas accumulator 71 and relief valve 55 which assist in maintaining a point of predetermined fixed pressure at point A. As a means of providing the required force balancing system for piston 20 at a null point, a pair of conduits 65 and 61 are utilized between the point of fixed pressure A and head 25 of cylinder 22. Included in conduit 61 is a flow control valve 63. Exhaust conduit 65 extends from conduit 61 at a point downstream of valve 63 to return fluid to sump 46. Exhaust conduit 65, in a manner similar to FIGURE 1, has therein included a flow control valve 67. As will be apparent from FIGURE 4, the differential positioning of piston 20 is accomplished by variable fluid output from valve 38a to its upper piston face. The balanced force system establishing a null position of the piston 20 comprises the oppositely directed fluid pressures through unrestricted conduit 57 and restricted conduit 61 against its respective faces. Again it should be noted that, in a manner similar to that shown in FIGURE 1, a single rod arrangement including rod 14c for the support of electrode 10 is employed. Rod 14c in this instance is of larger cross section and for equal advance and retract characteristics is one-half the area of piston 20.

FIGURE 5 shows a schematic diagram of a circuit which provides the electrical control for coils 42 and 44 in the first, electrically operable stage of servo valve 38. The electrode 10 and workpiece 12 are connected across an electrical discharge machining power supply of pulsating direct current voltage represented by the terminals 156, 158. The power supply may be of the RC relaxation oscillator type well known in the electrical discharge machining art and adequate to supply requisite voltage for causing discharge across the gap between electrode 10 and workpiece 12 in accordance with the characteristic of the circuit or may be of other more advanced pulser types such as the one described and shown in my U.S. Patent 3,062,985, issued on November 6, 1962. A sensing network comprising a resistor 114 and a capacitor 116 is connected across the machining gap. This sensing network presents at terminals 150, 152, the average voltage present across the gap. The terminal 150 is connected to the negative side of reference voltage source 144. The terminal 152 is connected through a rheostat 120 and a pair of double anode reference diodes 143, 145 to valve terminal 98. Rheostat 120 is shunted by diode 118. The reference voltage 144 is connected in parallel with a potentiometer 138, a limiting resistor 142 being connected in series. Limiting resistor 142 is included to insure back-up voltage at the minimum setting of potentiometer 138. Valve control coils 42, 44 are connected in series between terminals 98 and 100. Terminal 100 is connected through a rheostat 136 to terminal 154 which is the adjustable voltage terminal of potentiometer 138. Rheostat 136 is further shunted by a diode 134. A rheostat 128 is series connected with a diode 126 across servo coil terminals 98 and 100 and a parallel rheostat diode combination 132, 130 is similarly connected, the diode 130 being of opposite polarity to diode 126. The circuit is completed by capacitor 140 which connects terminal 100 with terminal 150.

In this circuit, a difference in voltage between terminal 152 which is at a potential of the average input voltage at the working gap and terminal 154 which is at a potential of the preset balance reference voltage is presented to the coils 42, 44 for controlling the electrode position. In actual practice, rheostats 120, 136 and potentiometer 138 may be ganged together to form the gap reference network operated by a common mechanical operating means 137 for adjusting potentiometer 138 and inversely varying rheostats 120 and 136 at the same time.

It will be seen that, in operation, sensing circuit 99 has a performance which is particularly advantageous and developed especially for use in this type of servo system in that there is provided a deadband or range of "no operation" about the reference voltage setting. By reason of the inclusion of one or more double anode reference diodes 143, 145 the problem of minute voltage unbalances between the sensing network and the reference network is eliminated. A difference equal to the amount of regulating voltage of the double anode reference diodes must exist between the sensing and reference networks before any operative voltage is supplied to the servo coils 42, 44. As an example, if the regulating voltage of diode 145 is two volts and that of diode 143 is ten volts, a net difference of at least 12 volts must exist between the voltage at points 152 and 154 before any electrical control signal is applied to the servo coils. This means that in the example given, in order to cause downfeed, the gap voltage must increase above the reference voltage by 12 volts in order to produce a downfeed signal and, oppositely, it must drop 12 volts below the reference voltage in order for a backup signal to be applied. This eliminates the continual hunting variance of the servo system during a normally acceptable gap voltage condition. Gap voltage provides the ideal characteristic to be sensed because the changes in gap voltage over a relatively wide range result in no loss in efficiency. A servo system maintaining gap voltage within this "dead center" range provides a mode of operation distinctly different from that utilized in known prior art systems. With this improved system, continuous hunting of the system about the reference voltage is eliminated and it is possible for the electrode 10 to move in the smallest discrete steps that can be achieved by the system. This method of operation is particularly important at the low feed rates of .001 inch per minute or less since continuous feed at this rate of advance is virtually impossible.

With further reference to the FIGURE 5, it will be seen that rheostat 132 and diode 130 determine the level of excitation of coils 42, 44 and the velocity of the downfeed of the electrode. Similarly, rheostat 128 and diode 126 provide the backup velocity control. The incorporation in the circuit of capacitor 140 additionally serves to act as a factor in eliminating over-travel of electrode 10, particularly when it is advancing downwardly. Capacitor 140 also serves to stabilize the performance of the circuit provided that the RC time constant is not less than approximately 20 times that of the machining time constant. During backup of the electrode 10, diode 134 shorts out rheostat 136 and terminal 162 and capacitor 140 remains for an appreciable time at the potential of point 154, thus allowing quick recovery after a short circuit condition at the gap.

FIGURE 6 illustrates an alternate embodiment of the present invention in which a hydraulic fluid motor 202 of the rotary actuator type is coupled to drive a mechanical gear train to effect the positioning of electrode 10. Fluid motor 202 has connected to its output shaft 203 a spur gear 204. Spur gear 204 meshes with gear 206 which is rigidly secured to the upper end of lead screw 208. Spur gear 206 may be of a split type construction and spring preloaded to eliminate backlash between it and gear 204. Lead screw 208 is connected to a ram 210 by threadably engaging a spring loaded ball-nut assembly 212. Thrust bearing 214 is utilized to permit rotation of lead screw 208 when it is driven by the rotation of gear 206. Rotation of lead screw 208 through its threaded engagement with nut assembly 212 causes ram 210 to advance or retract the electrode 10 in accordance with the direction of rotation of lead screw 208. The rotation and lateral displacement of ram 210 is prevented by proper adjustment of gibs 216 and 218 which in turn are attached to the rigid portion of machine column 220.

FIGURE 7 shows a hydraulic motor 202 of the rotary type as connected in servo systems of the type illustrated in FIGURE 1 or FIGURE 3. Control fluid flow from conduits 30 and 32 is directed in the manner illustrated to provide reversible action of motor 202. Motor 202 is shown with its end plate removed and comprises a body 220 having an internal cam ring 222, a rotor 224 and a plurality of laterally disposed vanes 226 mounted on rotor 224. It will be seen that each pair of vanes, as for example 226a and 226b, are mounted in a complementary fashion at 90° displacement from each other on rockers 228 which in turn are pivotally supported and preloaded at each end of rotor 224 to provide an outward force on the vanes tending to extend them into engagement with the outline of cam ring 222. Thus, as each vane is being pushed in by cam ring 222, its complementary vane is being pushed outwardly by their rocker 228. The direction of rotation of the rotor 224 and, consequently, the output shaft 203 is dependent upon the relative pressures exerted through conduits 30 and 32 and the reversible inlet-outlet ports of motor 202.

FIGURE 8 is a cross sectional view of a fixed orifice, flow restrictive means 229 which may be utilized in the servo systems of FIGURES 1, 3 and 4 and in place of the several flow control valves 59, 63, 67 and 69 shown therein. The flow restrictive means comprise a jet body 230 having a peripheral grooved portion 232 and an orifice portion 234 of a predetermined size and so proportioned as to provide for tubulent flow therethrough. It should be noted that, in servo systems of this type, the normal construction of servo valve 38 and 38a and certain other factors in the system contributing to leakage result in turbulent flow conditions and, therefore, orifice portion 234 must be constructed to produce turbulent flow. Turbulent flow may be characterized by the fact that changes in viscosity and hence changes in temperature do not cause a change in flow rate through a given orifice. Non-turbulent flow, on the other hand, does change with viscosity as is well known in the hydraulics art. Since the servo valve 38 is itself of turbulent flow construction it is, therefore, essential that the orifice portions 234 are also of turbulent flow construction so that the match of centering conditions is maintained regardless of changes in fluid viscosity or temperature. This is accomplished by the design of body 230 so that the length of the passage of orifice 234 is extremely small relative to its cross sectional area. It has been found that fixed orifice, flow restrictive devices having the trade-name "Lee Jets" manufactured and sold by the Lee Company of Westbrook, Connecticut, are particularly suitable for the present use. The flow restrictive means additionally includes a tapered expander plug 236 which, when driven into the opening of body 230 expands the body so that its peripheral grooved portion 232 is securely seated into the adjacent walls of the conduit in which it is mounted. Also included are a pair of filter screens 238a and 238b which provide bidirectional filtering to avoid blocking of the minute passageway through orifice portion 234.

FIGURE 9 shows a pair of friction shoes 240, 242 which may be utilized in the servo feed systems of FIGURES 1, 3 and 4 for selectively adjusting the static friction in the system. It has been found that operation of such servo systems may be greatly improved by the incorporation of means for selectively adjusting the static friction of the system. It has further been found that, for best operation, the static friction force present should be approximately equal to 5% of the maximum force available from the piston. For this purpose, friction shoes 240, 242 are mounted on vertical machine column 243 and extend forwardly therefrom and into engagement with the piston rod 14 or other suitable portions of the electrode bearing mechanism. Friction shoes 240, 242, further, are spring biased into engagement with diametrically opposite portions of rod 14 by the action of springs 244 and 246, respectively. Adjusting screws 248 and 250 are provided for selectively varying the spring pressure and, hence, the static friction effective on rod 14. It will be noted that the structure of FIGURE 9 has a similar purpose to the gear train mechanism shown in FIGURE 6 namely that of stabilizing the electrode feed mechanism against disturbing forces such as that exerted by coolant pressure in the axial direction or of weight of the electrode and supporting structure. Friction shoes 240, 242 may be incorporated in the servo feed system of FIGURE 6 in engagement with suitable portions of the electrode bearing mechanism as required, depending on the preloading or inherent friction of the gears.

FIGURE 10 is a schematic diagram showing an alternate form of electrical control circuit which provides the electrical control signal for coils 42 and 44 in the first, electrically operable stage of servo valve 38. The electrode 10 and workpiece 12 are shown connected across an electrical discharge machining power supply 105 which provides machining pulses to the gap. Sensing network 99 comprises a resistor 316 and a capacitor 318 connected across the machining gap. Sensing network 99 presents at terminal 100 the average voltage present across the gap which in turn is a function of gap spacing. Servo coils 42 and 44 are series connected. A reference voltage source is provided by D.C. supply 120. Connected across D.C. supply 120 are fixed resistors 322, 324 and potentiometer 326. Resistor 324 is included for providing a predetermined voltage difference between the back-up and down feed reference voltages independent of the setting of potentiometer 326. Means is further provided for furnishing a unidirectional power flow path to provide electrode backup which includes diode 330, rheostat 332, current limiting resistor 334 connected between terminal 336 and the servo coils 44, 42. Means is further provided for furnishing an opposite unidirectional power flow path for electrode downfeed which includes diode 338, rheostat 340, and current limiting rheostat 340. A potentiometer 341 is connected as shown across a double anode reference diode 343 and the servo coils 42, 44 are connected from one end to the adjustable tap of potentiometer 341 for providing a portion of the voltage developed across the reference diode 343 to the servo coils.

FIGURES 11 and 12 show two additional species of sensing network 99 as shown in FIGURES 1 and 10. The sensing network of FIGURE 11 shows a diode 344 and a capacitor 346 serially connected across the machining gap to provide an output signal which is a function of gap striking voltage. By "gap striking voltage" is meant that gap peak voltage that exists for sufficient time just prior to each gap discharge to breakdown and ionize the dielectric filled gap thereby causing the discharge. The time required for the dielectric breakdown is somewhat dependent upon the magnitude of voltage for a particular gap but is of the order of a microsecond. Transient voltages of much higher magnitude and much shorter duration may exist across the gap without causing breakdown and are thus not included within the definition. Capacitor 346 serves to store gap striking voltage which level is reflected at point 100. FIGURE 12 shows a still further embodiment of sensing circuit 99 in which a signal resistor 348 is connected in series with the gap. Connected across resistor 348 are resistor 350 and capacitor 352 to provide a voltage output at point 100 which is a function of current flowing in the gap.

*Description of operation*

With reference to FIGURES 1 and 2, it will be seen that the downfeed and backup of electrode 10 is controlled by voltage signals representative of gap spacing received by the electrical stage of directional control valve 38. If reversal of feed is directed by a change of polarity at terminals 98 and 100, the spool 40 of valve 38 must undergo a reversal of position past its central or null position where no difference of pressure is communicated through conduits 30 and 32 to initiate the upward or downward movement of piston 20. Where machining conditions are at an optimum at an exceedingly close gap spacing of electrode 10 and workpiece 12, it will be seen that a constant hunting, i.e., upward and downward movement of the electrode results in the absence of the present invention. The objections mentioned above in a standard hydraulic system are such that stability of the machining operation is impaired. Overrun in a downward direction can cause the electrode 10 to strike the workpiece 12 and result in damage to both. Use of mechanical biasing means such as, for example, centering springs does not present a solution to this problem because of their non-linearity of flexure, proneness to fatigue and other like factors. To provide for establishing a null position of the piston 20, a more reliable prebiasing force system is required. This may be accomplished through the expedient of providing selectively preset opposing fluid forces to the motive element of the fluid motor, that is, to the faces of piston 20 through flow restrictive means connected between opposing faces of piston 20 and a fixed pressure point. The flow restrictions may be incorporated directly in the fluid supply lines utilized. It was found to be advantageous to utilize a common constant pressure source from pump 54 both to operate the directional control valve 38 and to provide a point of fixed pressure for balancing piston 20 at a null point. By making the restriction adjustable, as by the incorporation of flow control valves 59, 63, 67 and 69, the balancing system can be preset to compensate for variations in the system arising from such factors as different levels of static friction operating on the piston, changes in weight of electrode or supporting structure, shift of null point of valve 38 due to temperature changes or other factors, and variance in coolant force which may result from varying pressure or effective area and may exert appreciable upward and disturbing forces on the piston. It should be further noted that the operative faces of piston 20 differ in area because of rod 14 and this requires the application of opposite and different forces through conduits 32 and 30 to achieve a properly balanced stationary position of the piston. By selective change of the balancing forces applied to piston 20, it is possible to permit its initial movement at any desired position at or near null of valve 38. In other words, the present invention affords a ready and positive means for predetermining and fixing the null characteristics of the system.

One of the most important advantages afforded by the present invention is that the electrode or ram may be maintained in an absolutely stationary or fixed position during electrode setup. As described above, it is necessary to make mechanical measurements and adjustments during the mounting of the electrode and prior to machining. Present systems employ elaborate and ineffective balancing mechanisms or provide ram locks and pressure interlocks with the hydraulic system in an effort to maintain the electrode in a fixed position during setup. These provisions have been found to be ineffective frequently contributing to loss of accuracy, and, because of the inherent characteristics of the valve and the system itself, are subject to continual change. In other words, a preset balancing system may provide momentary balance of the ram only to have it disturbed by a slight change in temperature or contamination of components in the hydraulic servo system.

In some instances, restrictions of the fixed-orifice, turbulent flow type as shown in FIGURE 8 may be preselected for a given machine construction and thus require no attention of the operator in readjusting of the various control orifices. Where the machine construction is such that the normal electrodes mounted in the machine or the type of operations to be done result in a relatively heavy electrode or may under some circumstances operate with relatively large coolant forces, use of adjustable flow control valves is preferred. In the system of FIGURE 1, normally, flow control valves 59 and 63 should provide a larger orificed restriction than flow control valves 67 and 69. During null or static setup condtiions, valve 63 is normally adjusted so that the pressure in the upper chamber of the cylinder is less than the pressure in the lower chamber by a sufficient amount to compensate for the difference in piston face area and the weight loading of the piston rod 20 and associated mechanism. A typical servo valve such as valve 38 has a port width and a length of travel of about .040 inch for full flow characteristics. Thus in the system of FIGURE 1, the larger restrictions provided by valves 59 and 63 may provide for approximately 10% of the full flow. Therefore, their hole sizes may be approximately 10% of the full, open port size of servo valve 38. Under conditions where extremely large and heavy electrodes are used for machining large stamping or forging dies, the adjustment of other valves in addition to valve 63 may be required. As valve 63 is closed, pressure in the upper head portion of cylinder 22 is reduced, tending to cause backup to compensate for the weight of the electrode. Where the unbalance is substantial, it may be necessary to open valve 59 at the same time to apply increased pressure to the lower head portion of cylinder 22. Thus, operation of valves 63 and 59 is oppositely phased and the two may be ganged together to form a single balancing control. After setup, the electrode 10 may be advanced toward the workpiece 12 under manual control to a point where full coolant force engages the face of the electrode. Should this force be sufficient to cause an upward motion of the system in the absence of an electrical control signal from sensing circuit 99, a downward biasing of the system is required and valves 59 and 63 may be oppositely adjusted. It will be understood that operation of one valve alone is possible, or conceivably, operation of all four valves may be necessary to achieve proper adjustment under varying conditions present in the system.

FIGURE 3 shows a servo-feed system having a mode of operation substantially similar to that of the system of FIGURE 1. It will be observed, however, that by reason of the incorporation of rods 14a and 14b, the operative areas of the piston 20 faces are substantially equal. The balancing forces required are then usually controlled by the presetting of flow control valves 59 and 63 alone. Thus, in the absence of appreciable differences of fluid output from outlet ports 34 and 36, the piston 20 will be maintained in any stationary position to which it has previously been advanced. Where substantial unbalance in forces exists as with heavy electrodes or supporting structure or large coolant forces, the four restriction system of FIGURE 1 is required even with the double rod system of FIGURE 3.

FIGURE 4 provides an additional embodiment of the present invention in which a single rod 14c is employed which is of relatively large diameter as compared to rods 14, 14a, and 14b of FIGURES 1 and 3, respectively. Use of a three-way, directional control valve 38a in place of a four-way directional control valve 38 provides a single, variable output to control the movement of piston 20. Again, a force balancing system is employed through conduits 57 and 61 to provide opposite and balancing forces to the faces of piston 20. Since a constant, upward, unrestricted reference force is required on piston 20, no flow control valve is required in conduit 57. By the selective presetting of either or both of valves 63 and 67, a stationary position of piston 20 and, consequently, of electrode 10 may be achieved.

By reason of the mode of operation previously discussed for the circuit of FIGURE 5, it will be seen that the electro-hydraulic servo system of the present invention is electrically controlled in such a manner that the electrical circuit is stabilized with respect to the electrical control signal provided to the first stage of directional control valve 38 or 38a in the systems of FIGURES 1, 3, 4 and 7. This is accomplished as has been emphasized through the establishing of a null voltage range of operation by reason of the inclusion of double anode reference diodes 143, 145 in the circuit of FIGURE 5. The hydraulic servo system is further stabilized with respect to its fluid motor components by the inclusion of the prebiasing fluid pressures through the system as best shown in FIGURES 1, 3 and 4.

The most important and inventive feature of the servo system herein described is provided by the electrical control circuits of FIGURES 5 and 10. Stabilization of the entire system is electrically controlled in such a manner that the electrical control signal as applied to the first stage of directional control valve 38 is provided about a deadband or null region of operation. This is accomplished as has previously been indicated by the incorporation in the circuit of a means operable to block power flow between the sensing means and the reference voltage and hence through the control element comprising control coils 42, 44 so long as the voltage difference between the sensing means and reference voltage as reflected at points 152–154 falls outside a predetermined range.

An alternate embodiment of the primary inventive feature of the servo feed system herein described is provided by the electrical control circuit of FIGURE 10. Stabilization of the servo system during changeover between backup and downfeed conditions is electrically controlled in such a manner that constant hunting of the electrode 10 as is experienced particularly at close gap spacing is substantially eliminated. In the operation of the circuit, electrode downfeed is initiated when gap voltage sensed by sensing network 99 and reflected at point 100 is at a level above the reference voltage as preset at the movable contact of potentiometer 326. Power flow thus occurs through coils 42, 44 to initiate the action of servo valve 38 and that of hydraulic motor 22, through diode 338, rheostat 340 and current limiting resistor 342. Servo velocity control is provided by the setting of potentiometer 341. It is important to note that downfeed occurs only above that voltage level preset by the movable contact of potentiometer 326. When the voltages at point 100 and at the reference voltage level provided by potentiometer 326 become equal, current flow through coils 42, 44 from terminal 98 to terminal 100 will cease and the downfeed condition will be ended. Backup, on the other hand, will not occur until the reference voltage potential at point 336 is greater than the gap voltage sensed and reflected at terminal 100. In the backup condition, power flow is through fixed resistor 334, rheostat 332, diode 330, terminal 98, coils 44, 42 to terminal 100. No backup can occur until gap voltage at terminal 100 falls below the reference voltage potential at point 336. Otherwise stated, the reference voltage for backup is preset at a predetermined difference from the reference voltage for downfeed in such a manner that gap voltage must change in excess of that predetermined difference before change between backup and downfeed will take place. Resistor 324 is of fixed value while the resistance of 326 is selectable at will by the operator. Otherwise stated, the downfeed and backup voltages are separated by a predetermined voltage range of null operation. The downfeed and backup velocities are variable by rheostats 340 and 342, respectively, which are normally ganged for operation. Rheostats 340 and 342 may be eliminated from the circuit, if potentiometer 341 is included. Double anode reference diode 343 is connected in shunt with control coils 42, 44 to limit voltage thereacross above a predetermined maximum. The outstanding advantage of the control circuit of FIGURE 10 will thus be seen in the manner in which it eliminates the "hunting" normally occurring in the power feed system. The operation of the circuit of FIGURE 10 with substitution therein of the sensing networks 99 of FIGURES 11 and 12 is substantially as hereinbefore described, the only difference being in the manner in which the electrical voltage signal characteristic of the gap and, hence, of a function of gap spacing is derived. The importance of the present invention as used in electrical discharge machining is further highlighted when we consider that during normal machining the rate of advance of .00001 inch per minute is so low that the "open-close" action of valve 38 necessarily causes electrode movement in steps rather than by a continuous advance. The present invention serves to positively, yet in a readily adjustable manner, control this condition and maintain the machining gap constant. This "deadband" type of operation is of particular merit when combined with striking voltage sensing. Gap striking voltage is ordinarily responded to over a broad range of, for example, 20 to 70 volts with satisfactory machining operation occurring over a broad range between those levels. Hence, "deadband" operation in connection with this type of sensing is of particular advantage.

While the present invention has been described particularly as it is used in an electrical discharge machining apparatus, it will be seen that the inventive concept is not so limited but is applicable to any electrically operated servo system of the continuous type.

I claim:

1. In combination with electrical discharge machining apparatus having means for passing current across a gap between an electrode and a workpiece in the presence of a dielectric coolant, servo means for controlling the gap spacing of the electrode and workpiece comprising reversible motive means, a sensing means connected to said gap and operative to provide a voltage output representative of an electrical characteristic of said gap, a reference voltage, an electrically energized element operatively connected between said sensing means and said reference voltage for controlling operation of said motive means in response to direction of current flow through said element, a first means for providing a unidirectional, power flow between said sensing means and said element, a second means for providing a unidirectional, power flow from said reference voltage to said element, and a non-linear means operatively connected to said element for blocking power flow therebetween in at least one direction responsive to voltage difference within a predetermined range, said non-linear means sharply conductive responsive to voltage difference outside said predetermined range.

2. The combination as set forth in claim 1 in which said sensing means comprises a signal resistor and a capacitor serially connected across the gap for sensing gap voltage.

3. The combination as set forth in claim 1 in which said sensing means comprises a diode and a capacitor serially connected across said gap for sensing gap striking voltage.

4. The combination as set forth in claim 1 in which a signal resistor is connected in series with said gap and in which a resistor and a capacitor are connected thereacross for providing an output voltage representative of gap current.

5. The combination as set forth in claim 1 in which said non-linear means comprises at least one double anode reference diode.

6. In an electrical discharge machining apparatus having means for passing current across a gap between an electrode and a conductive workpiece in the presence of a dielectric coolant for machining the workpiece, servo means for controlling the gap spacing of the electrode and the workpiece comprising reversible motive means, a sensing means connected to said gap and operable to provide a voltage output representative of an electrical characteristic of said gap, a variable reference voltage source, an electrically energized element connected between said sensing means and said reference voltage source for controlling operation of said motive means in response to direction of current flow through said element, a first means for providing a unidirectional, variable impedance power flow from said sensing means to said element, a second means for providing a unidirectional, variable impedance power flow from said reference voltage source to said element, a control means for selectively presetting the magnitude of said reference voltage source and proportionally decreasing and increasing the effective value of said first and second impedances between said sensing means and said element and between said voltage source and said element, respectively, and non-linear means connected between said sensing means and said reference voltage source for blocking flow therebetween in at least one direction responsive to voltage difference within a predetermined range, said non-linear means sharply conductive responsive to voltage difference outside said predetermined range.

7. In an electrical discharge machining apparatus having means for passing current across a gap between an electrode and a conductive workpiece in the presence of a dielectric coolant for machining the workpiece, servo means for controlling the gap spacing of the electrode and the workpiece comprising reversible motive means, a sensing means responsive to an electrical characteristic of the gap and operative to produce a voltage output representative thereto, a variable reference voltage, an electrically energized element operatively connected and controlling the operation of said motive means in response to direction of current flow through said element, means for defining a first power flow path in one direction through said element between said sensing means and said reference voltage, means for defining a second power flow path in the opposite direction through said element between said sensing means and said reference voltage, a power limiting means operatively connected to each of said two last mentioned means, a control means for varying the magnitude of said reference voltage and inversely varying the magnitude of each of said power limiting means with respect to the other, and a non-linear means connected between said sensing means and said reference voltage for blocking power therebetween in at least one direction responsive to voltage difference within a predetermined range, said non-linear means sharply conductive responsive to voltage difference outside said predetermined range.

8. In combination with electrical discharge machining apparatus having means for passing current across a gap between an electrode and a workpiece in the presence of a dielectric coolant, servo means for controlling the gap spacing of the electrode and workpiece comprising reversible motive means, a sensing means connected to said gap and operative to provide a voltage representative of an electrical characteristic of the gap, a reference voltage, an electrically energized element operatively connected between said sensing means and said reference voltage for controlling operation of said motive means in response to direction of current flow through said element, means for providing a pair of opposite, unidirectional power flow paths through said element between said sensing means and said reference voltage, means operatively connected to said element for establishing a null range of operation for said element within a predetermined voltage range, and means for applying a balancing force in said null operation of said element to said motive means to maintain it in a stationary position.

9. The combination as set forth in claim 8 in which said means for establishing a null range of operation of said element comprises a non-linear means operatively connected to said element and said voltage, said non-linear means operable to block power flow in at least one direction responsive to voltage within said predetermined range.

10. The combination as set forth in claim 8 in which said reference voltage is connected as the terminal of one of said power flow paths and in which a second reference voltage differing a predetermined magnitude therefrom is connected as the terminal of the other of said power flow paths.

11. In an electrical discharge machining apparatus having an electrode adapted to be maintained in constant selected gap relationship with a workpiece, a servo feed system comprising a cylinder, a piston differentially positionable in said cylinder in response to variances in operating fluid flow and connected to provide relative movement between electrode and workpiece, said cylinder having reversible inlet and outlet ports, a directional control valve for controlling the movement of said piston through fluid flow to said ports, said directional control valve having an electrically energized element and an operating fluid output means operatively connected to and controlled by said elements, a sensing means operatively connected to sense an electrical characteristic of the gap for providing an electrical control signal to said element, a reference voltage source, a non-linear means operatively connected to said element for establishing a predetermined voltage range of null of said element, and means for applying a balancing pressure in the null output condition of said sensing means to said piston to maintain it in a stationary position.

12. The combination as set forth in claim 11 in which said last mentioned means comprises a source of constant pressure fluid, a first conduit connecting said source to one port of said cylinder, a second conduit connecting said source to the other port of said cylinder, and presettable flow restrictive means in at least one of said conduits.

13. The combination as set forth in claim 12 in which said flow restrictive means is of the turbulent flow type.

14. In combination with electrical discharge machining apparatus having means for passing current across the gap between an electrode and a workpiece in the presence of a dielectric coolant for machining the workpiece, servo means for controlling the gap spacing between the electrode and workpiece comprising reversible motive means, a sensing means operatively connected to said gap for providing a voltage output representative of an electrical characteristic of said gap, an electrically energized element for controlling operation of said motive means in response to direction of current flow through said element, a first and a second reference voltage having predetermined difference of magnitude, a means for increasing the magnitude of one of said reference voltages with respect to the other comprising a variable resistor connected therebetween, a diode and a serially connected rheostat for providing unidirectional, variable impedance power flow path through said element between said first reference voltage and said sensing means, and a second diode oppositely poled from said first mentioned diode and a second serially connected rheostat for providing an opposite, unidirectional, variable impedance power flow path through said element between said second reference voltage and said sensing means.

15. A closed loop servo system for a controlled state device including reversible motive means comprising a sensing means operable to provide a variable voltage output characteristic of the state of the device, a first and a second variable reference voltage, an electrically energized element connected between said sensing means and said reference voltages, respectively, for controlling operation of said motive means in response to direction of power flow through said element, a first means for providing a unidirectional power flow from said first reference voltage through said element to said sensing means when said first reference voltage is higher than the voltage of said sensing means, a second means for providing a unidirectional power flow path from said sensing means to said second reference voltage when the voltage of said sensing means is higher than said second reference voltage, and means operatively connected to selectively vary said first reference voltage relative to said second reference voltage.

16. In an electrical discharge machining apparatus having means for passing current across a gap between an electrode and workpiece in the presence of a dielectric coolant for machining the workpiece, servo means for controlling the gap spacing between said electrode and workpiece comprising, reversible motive means, a sensing means operatively connected to said gap for providing a voltage output representative of an electric characteristic of the gap, an electrically energized element for controlling operation of said motive means, and a pair of differing magnitude reference voltages operatively connected to said sensing means and said element for initiating operation of said motive means in one direction responsive to one of said reference voltages and for initiating operation of said motive means in the opposite direction responsive to the other of said reference voltages, and a balancing means for applying a balancing force in the null output condition of said sensing means to said motive means to maintain it in a stationary position.

17. The combination as set forth in claim 16 in which said balancing means comprises a friction shoe operatively connected to said motive means.

18. The combination as set forth in claim 16 in which said motive means comprises the piston of a hydraulic motor, said piston mounted for reciprocal movement in a cylinder having a port proximate each end, and in which said balancing means comprises a source of constant pressure fluid, a first conduit connecting said constant pressure source to one port of said cylinder, a second conduit connecting said constant pressure source to the other port of said cylinder, and presettable flow restrictive means in at least one of said conduits.

19. The combination as set forth in claim 18 in which said flow restrictive means is of the turbulent flow type.

20. In an electrical discharge machining apparatus for machining a conductive workpiece by a tool electrode across a dielectric filled gap, a servo feed means comprising, electrically controlled and reversible motive means for providing relative motion between said electrode and workpiece comprising, sensing means operatively connected to said gap to provide an electrical output representative of a characteristic of said gap, means for establishing a level of operation of said characteristic, means for inhibiting the operation of said motive means below a predetermined deviation from said level and for activating said motive means above said predetermined deviation, and balancing means operatively connected to said motive means to provide a balancing force thereto to maintain it stationary in a null output condition of said sensing means.

21. A closed loop servo system for a controlled state device including reversible motive means comprising, a sensing means operable to provide an electrical output representative of a characteristic of the state of the device, means for establishing a level of operation of said characteristic, means for inhibiting the operation of said motive means below a predetermined deviation from said level and for activating said motive means above said predetermined deviation, and balancing means operatively connected to said motive means to provide a balancing force thereto to maintain it stationary in a null output condition of said sensing means.

22. In combination with electrical discharge machining apparatus having means for passing current across a gap between an electrode and a workpiece in the presence of a dielectric coolant, servo means for controlling the gap spacing of the electrode and workpiece comprising reversible motive means, a sensing means connected to the gap circuit and operative to provide a voltage representative of an electrical characteristic of the gap, a reference voltage, an electrically energized element operatively connected between said sensing means and said reference voltage for controlling operation of said motive means in response to direction of current flow through said element, means for providing a power flow path through said element between said sensing means and said reference voltage, and a non-linear means operatively connected to said element for establishing a null operation of said element within a predetermined voltage range, said non-linear means comprising a double anode reference diode connected between said sensing means and said element for blocking power flow responsive to voltage difference within said predetermined range.

23. In combination with electrical discharge machining apparatus having means for passing current across the gap between an electrode and a workpiece in the presence of a dielectric coolant, servo means for controlling the gap spacing of the electrode and workpiece comprising reversible motive means, a sensing means comprising a signal resistor connected in series with said gap and a capacitor and a resistor serially connected across said signal resistor for sensing gap current and providing a voltage output representative thereof, a reference voltage, an electrically energized element operatively connected between said sensing means and said reference voltage for controlling operation of said motive means responsive to direction of current flow through said element, means for providing a power flow path through said element between said sensing means and said reference voltage and means operatively connected to said element for establishing a null operation of said element within a predetermined voltage range.

24. In combination with electrical discharge machining apparatus having means for passing current across the gap between an electrode and a workpiece in the presence of a dielectric coolant, servo means for controlling the gap spacing of the electrode and workpiece comprising a reversible motive means, a sensing means comprising a diode and a capacitor serially connected across the gap for sensing gap striking voltage and providing a voltage representative thereof, a reference voltage, an electrically energized element operatively connected between said sensing means and said reference voltage for controlling operation of said motive means in response to direction of current flow through said element, means for providing a power flow path through said element between said sensing means and said reference voltage, and means operatively connected to said element for establishing a null operation of said element within a predetermined voltage range.

25. In combination with electrical machining apparatus having means for passing current across the gap between an electrode and a workpiece in the presence of a dielectric coolant, servo means for controlling the gap spacing of the electrode and workpiece comprising reversible motive means, a sensing means comprising a resistor and a capacitor serially connected across the gap for sensing average gap voltage and providing a voltage representative thereof, a voltage reference, an electrically energized element operatively connected between said sensing means and said reference voltage for controlling operation of said motive means in response to direction of current flow through said element, means for providing a power flow path through said element between said sensing means and said reference voltage and means operatively connected to said element for establishing a null operation of said element within a predetermined voltage range.

26. In an electrical discharge machining apparatus having means for passing current across a gap between an electrode and a workpiece in the presence of a dielectric coolant for machining the workpiece, servo means for controlling the gap spacing between said electrode and workpiece comprising reversible motive means, a sensing means operatively connected to said gap for providing a voltage output representative of an electrical characteristic of said gap, an electrically energized element for controlling operation of said motive means in response to direction of current flow through said element, a first and a second reference voltage, a first means for providing a unidirectional power flow path through said element between said first reference voltage and said sensing means, a second means for providing an opposite, unidirectional, power flow path through said element between said second reference voltage and said sensing means, said first and second reference voltages differing from each other by a predetermined amount, said first and second reference voltages derived from a potentiometer operatively connected to a D.C. supply.

References Cited by the Examiner

UNITED STATES PATENTS

| | | |
|---|---|---|
| 2,645,747 | 7/1953 | Lee. |
| 2,712,623 | 7/1955 | Yosano. |
| 2,818,490 | 12/1957 | Dixon et al. _____ 219—69 |
| 2,860,298 | 11/1958 | Carlson. |
| 2,984,761 | 5/1961 | Webb _____ 219—69 X |

JOSEPH V. TRUHE, *Primary Examiner.*